(12) United States Patent
Park et al.

(10) Patent No.: US 11,362,542 B2
(45) Date of Patent: Jun. 14, 2022

(54) ELECTRONIC DEVICE FOR WIRELESS CHARGING EXTERNAL DEVICE

(71) Applicant: Samsung Electronics Co., Ltd., Gyeonggi-do (KR)

(72) Inventors: Kyungmin Park, Gyeonggi-do (KR); Juhyang Lee, Gyeonggi-do (KR); Hyunho Lee, Gyeonggi-do (KR); Byungyeol Choi, Gyeonggi-do (KR); Kangjun Ko, Gyeonggi-do (KR); Yusu Kim, Gyeonggi-do (KR); Hyundeok Seo, Gyeonggi-do (KR); Mingi Song, Gyeonggi-do (KR); Wooram Lee, Gyeonggi-do (KR); Chihyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 141 days.

(21) Appl. No.: 16/776,035

(22) Filed: Jan. 29, 2020

(65) Prior Publication Data
US 2020/0266661 A1 Aug. 20, 2020

(30) Foreign Application Priority Data
Feb. 19, 2019 (KR) .................. 10-2019-0019471

(51) Int. Cl.
*H02J 7/00* (2006.01)
*H02J 50/10* (2016.01)
(Continued)

(52) U.S. Cl.
CPC ............ *H02J 50/10* (2016.02); *G06F 1/1626* (2013.01); *G06F 1/189* (2013.01); *H02J 50/80* (2016.02)

(58) Field of Classification Search
USPC .................. 320/106, 107, 108, 109, 110
See application file for complete search history.

(56) References Cited

U.S. PATENT DOCUMENTS 10,218,206 B2  2/2019  Lee et al.
2009/0140690 A1  6/2009  Jung
(Continued)

FOREIGN PATENT DOCUMENTS

EP         2 512 001     10/2012
KR    1020140017760      2/2014
(Continued)

OTHER PUBLICATIONS

International Search Report dated May 15, 2020 issued in counterpart application No. PCT/KR2020/000763, 9 pages.
(Continued)

*Primary Examiner* — Brian Ngo
(74) *Attorney, Agent, or Firm* — The Farrell Law Firm, P.C.

(57) ABSTRACT

An electronic device includes a housing including a first plate, a second plate spaced apart from the first plate and facing the first plate, and a side member at least partially surrounding a space between the first plate and the second plate, a display located in the space and visible through the first plate, a conductive coil parallel to the second plate and disposed between the display and the second plate, a wireless charging circuit electrically connected to the conductive coil, and a processor operationally connected with the display and the wireless charging circuit. The processor receives a power control signal from an external device, applies a charging current to the conductive coil, based on the power control signal, senses whether a specified event occurs while the charging current is applied, and when the specified event occurs, transmits information for setting a charging power corresponding to the specified event to the external device.

20 Claims, 11 Drawing Sheets

(51) Int. Cl.
*H02J 50/80* (2016.01)
*G06F 1/18* (2006.01)
*G06F 1/16* (2006.01)

(56) References Cited

U.S. PATENT DOCUMENTS

| | | |
|---|---|---|
| 2012/0261998 A1 | 10/2012 | Sato |
| 2013/0099734 A1 | 4/2013 | Lee et al. |
| 2013/0181539 A1 | 7/2013 | Muratov et al. |
| 2014/0210407 A1 | 7/2014 | Won et al. |
| 2016/0164338 A1 | 6/2016 | Jung |
| 2016/0181856 A1 | 6/2016 | Lee et al. |
| 2016/0204642 A1 | 7/2016 | Oh et al. |
| 2017/0025887 A1* | 1/2017 | Hyun .................. H02J 7/00714 |
| 2017/0033581 A1* | 2/2017 | Horii .................. H02J 50/10 |
| 2017/0163076 A1* | 6/2017 | Park .................. H02J 50/10 |
| 2017/0250576 A1 | 8/2017 | Jung |
| 2017/0324279 A1* | 11/2017 | Kang .................. H02J 50/80 |
| 2018/0034307 A1* | 2/2018 | Ha .................. H02J 7/025 |
| 2018/0241255 A1* | 8/2018 | Leabman .................. H02J 50/23 |
| 2018/0301937 A1* | 10/2018 | Park .................. H02J 50/12 |
| 2018/0366986 A1 | 12/2018 | Kim et al. |
| 2019/0245373 A1 | 8/2019 | Oh et al. |
| 2020/0012353 A1* | 1/2020 | Kim .................. H02J 50/90 |
| 2020/0036217 A1 | 1/2020 | Park et al. |
| 2020/0136421 A1* | 4/2020 | Kim .................. H02J 50/80 |
| 2020/0266661 A1* | 8/2020 | Park .................. H02J 50/80 |
| 2021/0218284 A1 | 7/2021 | Oh et al. |

FOREIGN PATENT DOCUMENTS

| | | |
|---|---|---|
| KR | 10-2015-0010460 | 1/2015 |
| KR | 10-2018-0075342 | 7/2018 |

OTHER PUBLICATIONS

European Search Report dated Dec. 23, 2021 issued in counterpart application No. 20759475.5-1202, 13 pages.
European Search Report dated May 2, 2022 issued in counterpart application No. 20759475.5-1202, 12 pages.

* cited by examiner

ELECTRONIC DEVICE FOR WIRELESS CHARGING EXTERNAL DEVICE

CROSS-REFERENCE TO RELATED APPLICATION(S)

This application is based on and claims priority under 35 U.S.C. § 119 to Korean Patent Application No. 10-2019-0019471, filed on Feb. 19, 2019, in the Korean Intellectual Property Office, the entire disclosure of which is incorporated herein by reference.

BACKGROUND

1. Field

The disclosure relates generally to a technology for blocking wireless charging and preventing a malfunction of an external device.

2. Description of Related Art

A battery may be embedded in an electronic device that may perform various functions (e.g., execution of an application) by using power saved in the battery. When the battery is discharged or the battery has a low voltage level, a user may charge the battery by wired charging or wirelessly charging.

In a wired charging method, the user may charge the battery by directly connecting the electronic device with a travel adapter (TA) through a cable. In a wireless charging method, when the user places the electronic device on a wireless charging device (e.g., a wireless charging pad), the wireless charging device may charge the battery.

However, because the wired charging method and the wireless charging method both charge the battery through a separate device (e.g., the TA or the wireless charging pad), the user may charge the battery only while the user is carrying the separate device. Accordingly, in recent years, a technology for charging the battery without the separate device has been actively developed. For example, technologies for charging the external device using power saved in the battery of the electronic device have been actively developed.

Thus, it may be advantageous to develop a technology that consistently and effectively is able to charge a battery of an electronic device.

SUMMARY

The present disclosure has been made to address the above-mentioned problems and disadvantages, and to provide at least the advantages described below.

In accordance with an aspect of the disclosure, an electronic device includes a housing including a first plate, a second plate spaced apart from the first plate and facing the first plate, and a side member at least partially surrounding a space between the first plate and the second plate, a display located in the space and visible through the first plate, a conductive coil parallel to the second plate and disposed between the display and the second plate, a wireless charging circuit electrically connected to the conductive coil, and a processor operationally connected with the display and the wireless charging circuit, the processor may receive a power control signal from an external device, apply a charging current to the conductive coil, based on the power control signal, sense whether a specified event occurs while the charging current is applied, and when the specified event occurs, transmit information for setting a charging power corresponding to the specified event to the external device.

In accordance with another aspect of the disclosure, an electronic device includes a housing including a first plate, a second plate spaced apart from the first plate and facing the first plate, and a side member at least partially surrounding a space between the first plate and the second plate, a display located in the space and visible through the first plate, a conductive coil parallel to the second plate and disposed between the display and the second plate, a wireless charging circuit electrically connected to the conductive coil, and a processor operationally connected with the display and the wireless charging circuit, the processor may receive a power control signal from an external device, apply a charging current to the conductive coil, based on the power control signal to perform wireless charging for the external device, and when an event of increasing the charging current occurs during the wireless charging, transmit information for resetting a wireless charging protection algorithm to the external device, wherein the wireless charging protection algorithm may allow a battery included in the external device to be charged by maintaining a current flowing in the conductive coil included in the external device below a specified value.

In accordance with another aspect of the disclosure, a method for wirelessly charging an external device includes receiving a power control signal from the external device, applying a charging current to a conductive coil, based on the power control signal, sensing whether a specified event occurs while the charging current is applied, and transmitting information for setting a charging power corresponding to the specified event to the external device when the specified event occurs.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
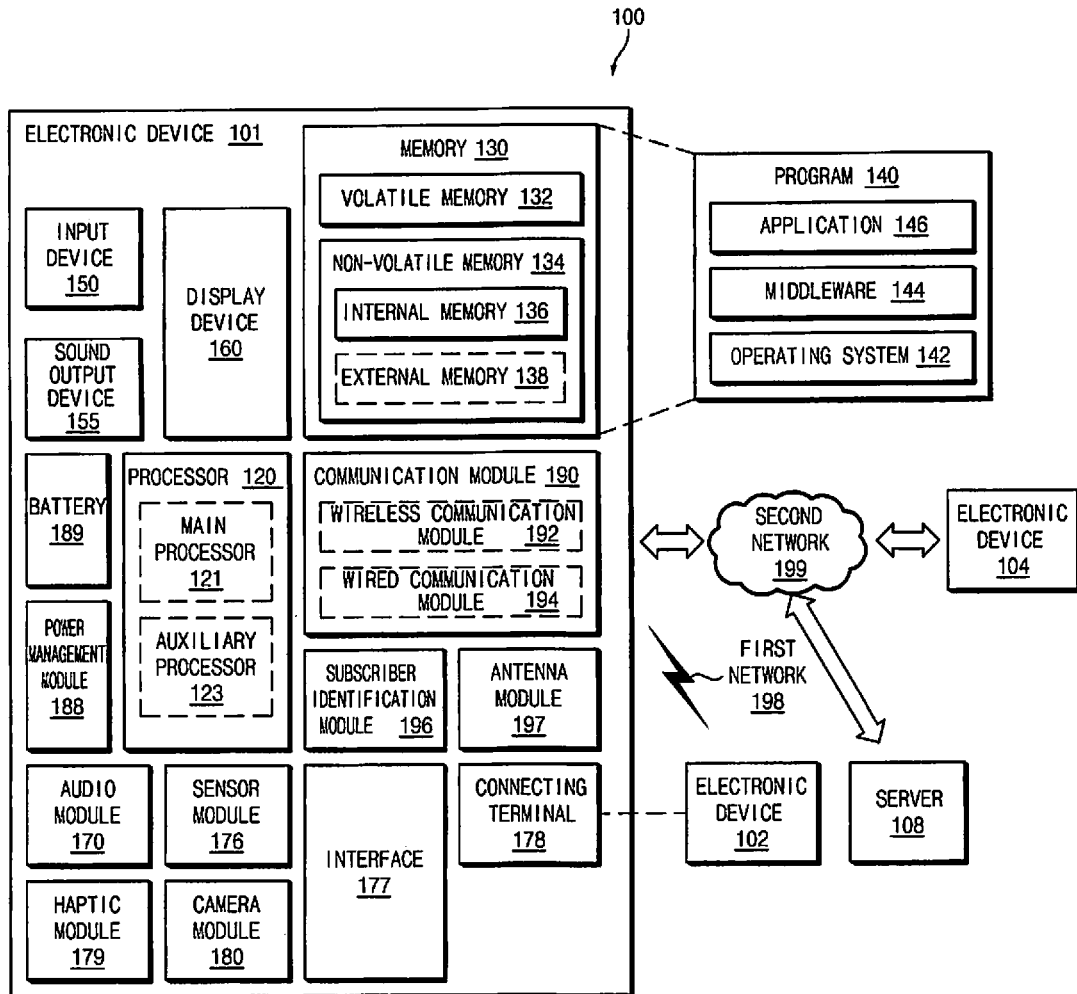
FIG. 1 is a block diagram illustrating an electronic device in a network environment, according to an embodiment.

Various embodiments of the disclosure are described with reference to the accompanying drawings. However, various embodiments of the disclosure are not limited to particular embodiments, and it should be understood that modifications, equivalents, and/or alternatives of the embodiments described herein can be variously made. With regard to description of drawings, similar components may be marked by similar reference numerals.

When charging an external device by an electronic device, an event that consumes power of the electronic device may occur. For example, when a display is turned on, or when the user executes an application, a current consumption of the electronic device may be generated that decreases power for charging the external device. When the available power to charge the external device is drastically decreased, charging may be interrupted, or a malfunction of the external device may occur.

In contrast, when charging the external device by the electronic device, although an event in which the electronic device may charge the external device at a higher power may occur, the electronic device may charge the external device at a lower power. For example, when the display is turned off, or when an application that is running terminates, the electronic device may charge the external device at a higher power. However, because the external device may not check an available amount of transmittable power of the electronic device, the battery may still be charged at a low power, which may take a long time.

Thus, the present disclosure may provide an electronic device for blocking wireless charging and preventing an external device from malfunctioning.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to, an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
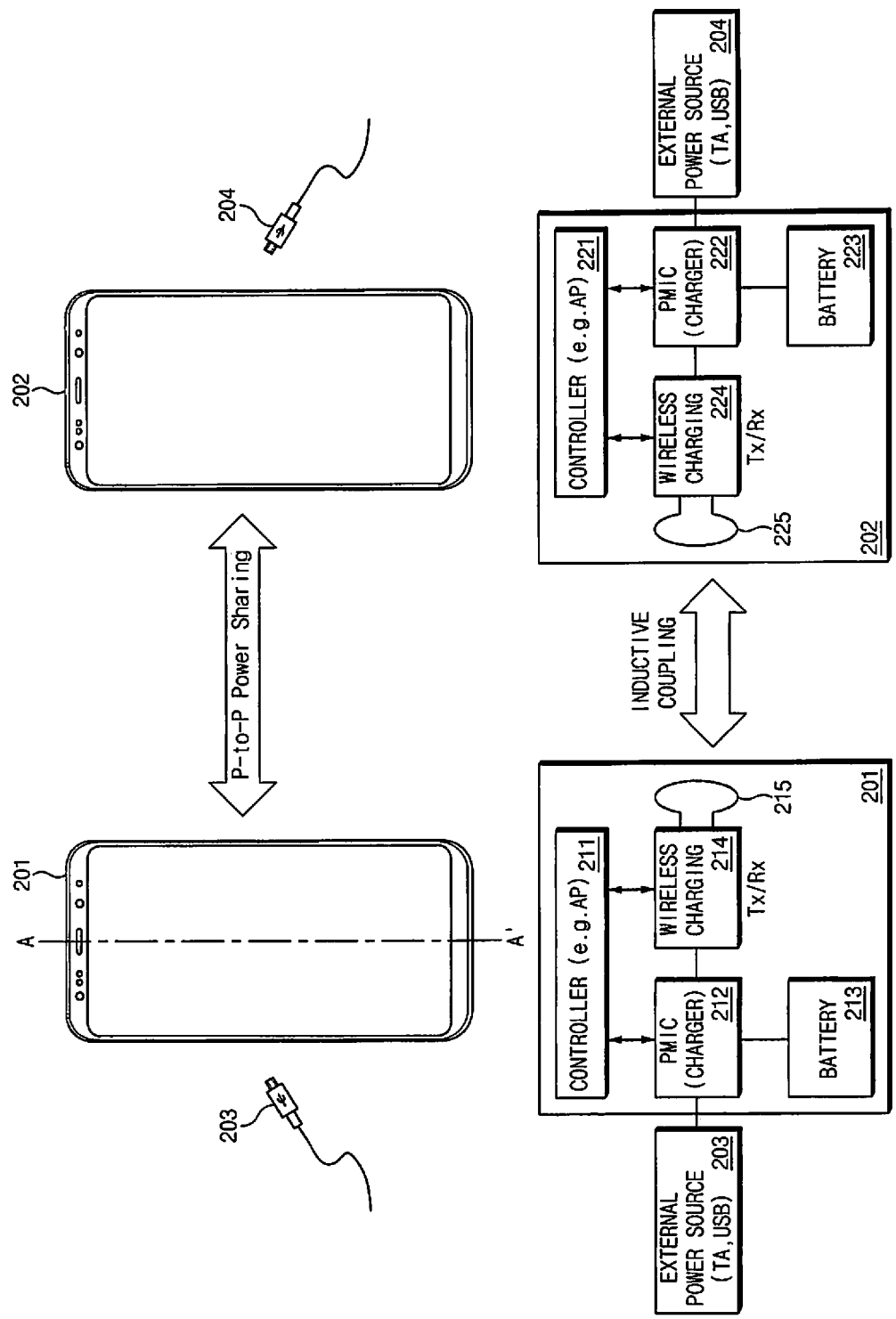
FIG. 2 illustrates the sharing of power wirelessly between a first electronic device and a second electronic device, according to an embodiment.

FIG. 2 illustrates the sharing of power wirelessly between a first electronic device and a second electronic device, according to an embodiment.

Referring to FIG. 2, although both a first electronic device 201 and a second electronic device 202 are represented as a device capable of transmitting and receiving wireless power, one of the two devices may be an electronic device capable of only receiving the power wirelessly. Although the first electronic device 201 and the second electronic device 202 are described as being an external electronic device, the second electronic device 202 may have the same configuration as the first electronic device 201 or a configuration in which only a wireless power transmission function is removed.

The first electronic device 201 may Include a first control circuit 211, a first power management circuit 212 (e.g., a PMIC), a first battery 213, a first wireless charging IC 214, and/or a first conductive coil 215.

The second electronic device 202 may include a second control circuit 221, a second power management circuit 222 (e.g., a PMIC), a second battery 223, a second wireless charging IC 224, and/or a second conductive coil 225.

The first conductive coil 215 may be formed spirally on the flexible printed circuit board (FPCB). The first wireless charging IC 214 may include a full bridge circuit. For example, the first wireless charging IC 214 may allow the full bridge circuit to be driven as an inverter (e.g., direct current (DC)→ alternating current (AC)) in a wireless power transmission operation, and allow the full bridge circuit to be driven as a rectifier (AC→DC) in a wireless power reception operation.

The first wireless charging IC 214 may exchange information necessary for the wireless power transmission through in-band communication with the second electronic device 202, based on a wireless power consortium (WPC) standard. For example, the in-band communication may be a way that data is exchanged between the first electronic device 201 and the second electronic device 202 through frequency or amplitude modulation of a wireless power transmission signal in a wireless power transmission situation between the first conductive coil 215 and the second conductive coil 225. The communication between the first electronic device 201 and the second electronic device 202 may use out-band communication. The out-band communication may be short-range communication such as near field communication (NFC), Bluetooth, or WiFi, which is different from a wireless power signal.

The first power management circuit 212 may include a function for charging the first battery 213 with wired and wireless input power, a function (e.g., a USB battery charging specification, a USB power delivery (PD) communication, an automatic frequency control (AFC) communication, and/or a quick charge (QC) communication) for communicating with the external power device (e.g., the travel adapter) connected to a USB terminal, a function of supplying a required power to the system and supplying the power corresponding to a required voltage level for each device, and/or a function of supplying the power to the first wireless charging IC 214 in a wireless power transmission mode.

A first external power source 203 may be a power source conforming to the USB standard. For example, the first external power source 203 may be an interface for USB charging and/or for an on the go (OTG) power supply. A TA or a battery pack may be connected to the first external power source 203.

The first control circuit 211 may integrally control a function of wired and wireless charging of the first electronic device 201, a function of USB communication with the second electronic device 202, and/or a function (e.g., a USB PD, a battery charging (revision) 1.2 (BC1.2), the AFC, and/or the QC) of communication with the second electronic device 202, based on a situation of the first electronic device 201. The BC1.2 or the PD may be the interface for communicating with the external power source (e.g., a TA), and the control circuit 211 may control communication with the external power source. For example, the first electronic device 201 may determine a temperature of the first electronic device 201 and/or a capacity of the first battery 213 of the first electronic device 201.

The first electronic device 201 may operate in a wireless power transmitting mode (Tx mode), using the first battery 213. Alternatively, when a wired power supply device is connected, the first electronic device 201 may preferentially use an external power source in the wireless power transmitting mode and charge the first battery 213 with the remaining power.

An operation of the electronic device (e.g., the first electronic device 201 of FIG. 2) in the wireless power transmitting mode may mean that the first electronic device 201 is in a state of transmitting the wireless power to the external electronic device (e.g., the second electronic device 202 of FIG. 2), using the first conductive coil 215. Alternatively, an operation of the first electronic device 201 in a wireless power receiving mode (Rx mode) may mean that the first electronic device 201 is in a state of receiving the wireless power from the external electronic device through the first conductive coil 215, and charging the first battery 213, using the received wireless power.

Figure 3:
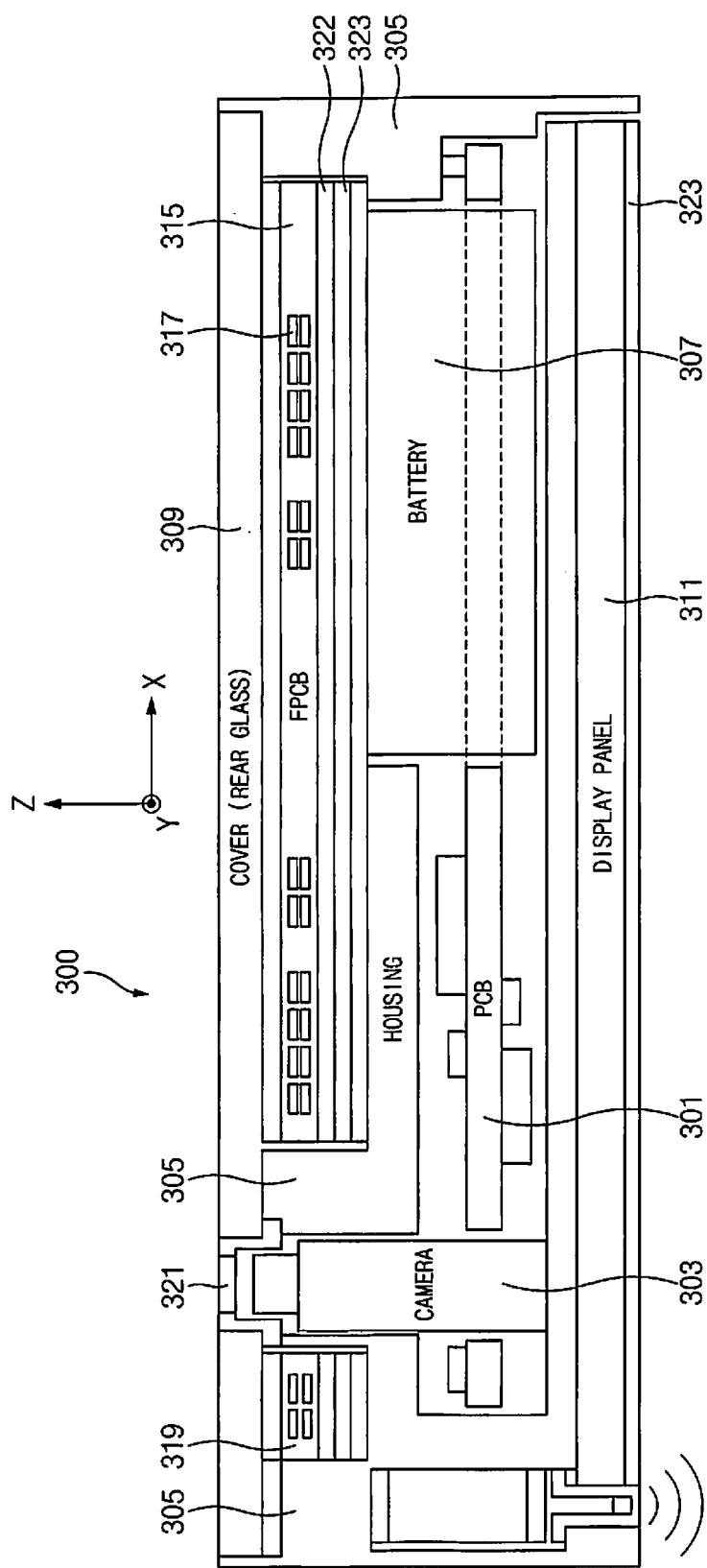
FIG. 3 illustrates a schematic cross-sectional view of an electronic device, according to an embodiment.

FIG. 3 illustrates a schematic cross-sectional view of an electronic device, according to an embodiment. More specifically, FIG. 3 illustrates a cross-sectional view taken along line A-A' of the first electronic device 201 illustrated in FIG. 2.

Referring to FIG. 3, an electronic device 300 includes a housing 305 that accommodates and houses one or more components, and a cover 309 that is fastened to the housing 305 at a back surface of the electronic device 300. The components may include a display panel 311, a substrate 301, a battery 307, a camera 303, or an FPCB 315, which are located inside the housing 305.

The display panel 311 may be located on a front surface of the electronic device and a glass (window cover) 323 may be attached on an upper surface of the display panel 311. The display panel 311 may be integrally formed with a touch sensor or a pressure sensor. The touch sensor or the pressure sensor may be separated from the display panel 311. The touch sensor may be located between the glass 323 and the display panel 311.

The substrate 301 may mount components such as the communication module 190, or the processor 120. The substrate 301 may be implemented using at least one of a PCB or an FPCB. The substrate 301 may operate as a ground plate capable of grounding a loop antenna 317.

The cover 309 may be divided into a conductive region made of a conductive material and a non-conductive region made of a non-conductive material. The cover 309 may be divided into the conductive region and the non-conductive region that is located on one side or both sides of the conductive region. At least one opening 321 may be formed in the cover 309 to expose some components of the electronic device 300 to outside of the electronic device 300. The cover 309 may include one or more openings 321 to expose the camera 303, the flashes, or the sensor (e.g., the fingerprint sensor).

The FPCB 315 may be attached to the bottom surface of the cover 309. The FPCB 315 may mount one or more loop antennas 317 and may be located to be electrically insulated from the conductive region of the cover 309.

The one or more loop antennas 317 may be the same type, or may be formed with one another. For example, the one or more loop antennas 317 may be a coil of a planar type. A first set of the one or more loop antennas 317 may be formed of the coil of the planar type, and a second set of the one or more loop antennas 317 may be formed of a coil of a solenoid type.

The one or more loop antennas 317 may include a wireless charging coil formed in a spiral pattern.

A magnetic field shielding layers (a shielding sheet 322 and a graphite sheet 323) may be formed in one direction of the one or more loop antennas 317. For example, the magnetic field shielding layers 322 and 323 may form a direction of a magnetic field from the coil in a backwards direction with respect to the electronic device 300 (e.g., Z direction in FIG. 3), and may suppress formation of a magnetic field in the electronic device 300 to prevent abnormal operation of other electronic components.

Figure 4:
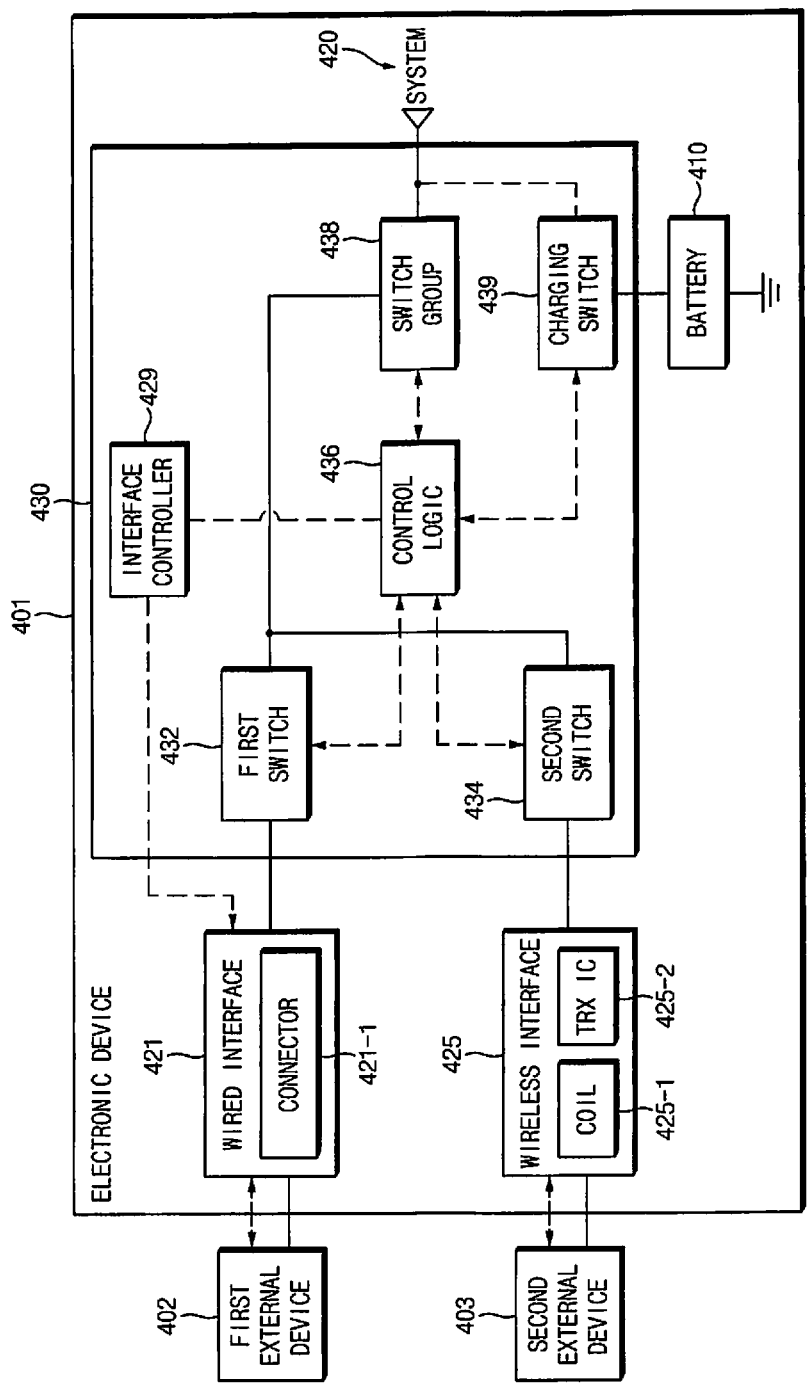
FIG. 4 illustrates a concept of a charging circuit in a first electronic device, according to an embodiment.

FIG. 4 illustrates a concept of a charging circuit in a first electronic device, according to an embodiment.

Referring to FIG. 4, an electronic device 401 includes a battery 410, a system 420, a wired interface 421, a wireless interface 425, and/or a charging circuit 430.

The battery 410 may be mounted in the housing 305 of the electronic device 401, and may be chargeable. The battery 410 may include, for example, a lithium-ion battery, a rechargeable battery, and/or a solar battery.

The wired interface 421 and the wireless interface 425 may be mounted on a part of a housing of the electronic device 401, and may be connected to an external device, respectively. The wired interface 421 may include, for example, a USB connector 421-1 wired to a first external device 402 through the connector 421-1. The wired interface 421 may be an interface for the USB charging and/or the OTG power supply, or may be connected to the external power source (e.g., the TA or the battery pack). The wireless interface 425 may include a coil 425-1 (also referred to as a "conductive pattern") (e.g., the one or more loop antennas 317 in FIG. 3) and a transmit/receive IC (TRX IC) 425-2, and may transmit and receive the power wirelessly with a second external device 403 through the conductive pattern 425-1 and the TRX IC 425-2. The wireless power may be transmitted and received using magnetic field inductive coupling, resonance coupling, or hybrid wireless power transmission. The conductive pattern 425-1 may include a first conductive pattern for transmitting the wireless power and a second conductive pattern for receiving the wireless power.

The first external device 402 may be a wired power supply device or a wired power receiving device as the external device connectable in a wired manner. The wired power receiving device may be the OTG device. The OTG device may be a powered device such as the mouse, the keyboard, a USB memory, and an accessory, connected to the electronic device 401. In this case, the electronic device 401 may operate in an OTG mode that supplies the external power source to the USB terminal. The wired power supply device may be a wired connecting device such as a TA to supply the power to the electronic device 401. The wired power receiving device may receive the power from an electronic device through the wired connection and use it as an internal power supply, and may charge another battery included in the wired power receiving device. The first external device connected to the electronic device 401 through the wired interface 421 may be a wired high voltage (HV) device (e.g., a device for supporting the power delivery (PD), the AFC, or the QC). When the wired HV device is connected to the connector, the electronic device 401 may supply power of a voltage (e.g., 9 volts (V)) higher than a voltage (e.g., 5V) supplied from the battery 410 to the wired HV device or receive the power from the wired HV device.

The second external device 403 may include a wireless power supply device or a wireless power receiving device. The wireless power supply device may be a device for supplying the wireless power to an electronic device, using the first conductive pattern, like a wireless charging pad. The wireless power receiving device may receive the wireless power supplied from the electronic device, using the second conductive pattern included in the wireless power receiving device, and may be a device that charges another battery included in the wireless power receiving device with the received power. The second external device 403 that is connected to the electronic device 401 through the wireless interface 425 may include a wireless HV device (e.g., a device that supports the AFC or the QC). The wireless HV device may include the wireless charging pad that supports fast charging. The wireless charging pad communicates with the TRX IC 425-2 through in-band communication to determine whether to perform fast charging or to perform fast charging using a separate communication module (the Bluetooth or Zigbee). For example, the electronic device 401 may request an HV of 9V, for example, to the wireless charging pad through the TRX IC 425-2, the wireless charging pad may determine whether fast charging is possible through communication with the electronic device 401, based on the HV charging request from the electronic device 401. When it is identified that fast charging is possible, the wireless charging pad may supply the power based on 9V to the electronic device 401.

The charging circuit 430 may be electrically connected to the battery 410, and may be configured to form an electrical connection between the wired interface 421 and the wireless interface 425, form an electrical connection between the battery 410 and the wired interface 421, and form an electrical connection between the battery 410 and the wireless interface 425. The charging circuit 430 may be configured to electrically connect the battery 410 and the conductive coil 425-1 (e.g., the first conductive pattern) to wirelessly transmit the power to the second external device (e.g., the wireless power receiving device). The charging circuit 430 may be configured to wirelessly transmit the power to outside the electronic device and to simultaneously transmit the power to the first external device (e.g., a wired power receiving device) through a wire, by electrically connecting the battery 410 to the connector. The charging circuit 430 may convert a first power generated by the battery 410 into a second power that is higher (i.e., higher in volts or higher in amperes) than the first power, thereby transmitting a third power that is at least a part of the second power to the wireless power receiving device through the conductive coil 425-1 (e.g., the first conductive pattern). The charging circuit 430 may transmit a fourth power, which is at least another part of the second power, to the OTG device or the wired power receiving device through the connector.

The charging circuit 430 may include an interface controller 429, a first switch 432, a second switch 434, a control logic 436, a switch group 438, and/or a charging switch 439.

The interface controller 429 may determine a type of the first external device 402 that is connected to the wired interface 421, and may determine whether fast charging is supported through the AFC communication with the first external device 402. The interface controller 429 may include a micro USB interface IC (MUIC) or a high speed charging (e.g., the AFC or the QC) interface. The MUIC may determine whether the first external device 402 that is connected to the wired interface 421 is the wired power supply device or the wired power receiving device. The high speed charging interface may determine whether to support fast charging through communication with the first external device 402. When supporting fast charging, the first external device 402 may increase transmission and reception power. For example, the first external device 402 may be the wired power supply device that typically transmits 10 watts (W) (about 5V/2 amperes (A)) of power, and when fast charging is supported, the first external device 402 may transmit more than 15 W (about 9V/1.6 A) of power.

The first switch 432 may include at least one or more switches, and may control power output to a device (e.g., the OTG device) connected through the wired interface 421 or to the wired power receiving device, and a power input from the wired power supply device. The first switch 432 may operate in an ON state such that the power to the OTG device or the wired power receiving device is output and the power from the wired power supply device is input, or may operate in an OFF state such that the power to the OTG device or the wired power receiving device is not output and the power from the wired power supply device is not input.

The second switch 434 may include at least one or more switches, and may control the power input and output from the wireless power supply device and the wireless power receiving device through the wireless interface 425 such as the conductive pattern 425-1 and the TRX IC 425-2. For example, the second switch 434 may operate in the ON state such that the power input and output is possible from the wireless power supply device or the wireless power receiving device, or may operate in the OFF state such that power input and output is not possible from the wireless power supply device or the wireless power receiving device.

The control logic 436 may control the power input from at least one of the first switch 432 and the second switch 434 to be converted into a charging voltage and a charging current suitable for charging the battery 410. The control logic 436 may control the power from the battery 410 to be converted into the charging voltage and charging current suitable for charging the battery of the external device that is connected to the first switch 432 and the second switch 434, respectively. The control logic 436 may control the power from the battery 410 to be converted into a voltage and a current suitable for use in the external device.

The control logic 436 may allow the charging circuit 430 to selectively transmit the power by the battery 410 to outside the electronic device, either wirelessly or through a wire. The control logic 436 also may control the power to be transmitted to the first external device 402 and/or the second external device 403 through the charging circuit 430, or may control the power to be received from the first external device 402 and/or the second external device 403.

The control logic 436 may control the battery 410 to be charged using the power received from the wired power supply device when the wired power supply device is connected. In addition, the control logic 436 may control the OTG function to be performed when the OTG device is connected. In addition, the control logic 436 may control the battery 410 to be charged by receiving the power from the wireless power supply device when the wireless power supply device is connected. In addition, the control logic 436 may control the OTG function to be performed simultaneously with charging the battery by receiving the power from the wireless power supply when the wireless power supply device and the OTG device are connected. In addition, the control logic 436 may control the power to be supplied to the wireless power receiving device by using the battery 410 when the wireless power receiving device is connected. In addition, when the wired power supply device and the wireless power receiving device are connected, the control logic 436 may control the battery 410 to be charged and simultaneously supply the power to the wireless power receiving device by receiving the power from the wired power supply device. In addition, when the OTG device and the wireless power receiving device are connected, the control logic 436 may control the OTG function and simultaneously supply the power to the wireless power receiving device, using the battery power.

The switch group 438 may boost or buck the voltage of the battery 410 to provide a uniform current to the system (e.g., the system 420 that supplies the power to each module of the electronic device) or to provide the uniform current to the connected external device. The switch group 438 may boost or buck the charging voltage that is provided to supply a uniform charging current to the battery 410. The switch group 438 may include a buck/boost converter.

The charging switch 439 may detect an amount of charging current, and may detect block charging of the battery 410 when the battery is overcharged or overheated.

The electronic device 401 may include the display 160. The display 160 may display a user interface that is configured to control at least a portion of the charging circuit 430. The display 160 may receive a user input such that the power from the battery 410 is transmitted to the external device wirelessly or through a wire (i.e., wired). The display 160 may display at least one or more external devices connected to the electronic device 401, and may display a battery remaining amount of the connected external device. Alternatively, the display 160 may display whether the power is being supplied to the connected external device or power is being received from the connected external device. When a plurality of external devices are connected, and the power is provided to each of the plurality of external devices, the display 160 may display a screen for adjusting the distribution of the power provided to each of the plurality of external devices, and may display a screen for selecting a power providing priority among the plurality of external devices. In addition, the display 160 may display a screen indicating information on the display 160 of the connected external device. At least a part of a content displayed on the display 160 may be changed depending on a signal received from the connected external device.

Figure 5:
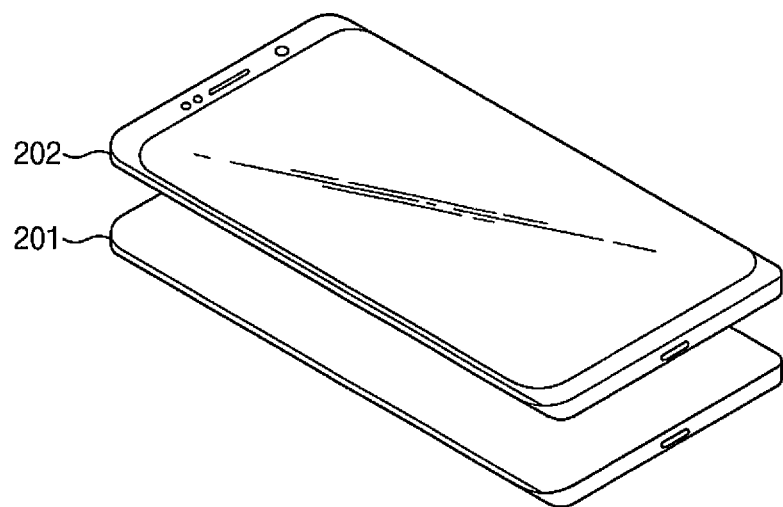
FIG. 5 illustrates a first electronic device charging a second electronic device, according to an embodiment.

FIG. 5 illustrates a first electronic device charging a second electronic device, according to an embodiment.

Referring to FIG. 5, the first electronic device 201 may charge the second electronic device 202. For example, when the second battery 223 of the second electronic device 202 is discharged or the battery level is low, the first electronic device 201 may transmit the power of the first battery 213 to the second electronic device 202 to charge the second battery 223 of the second electronic device 202.

The first electronic device 201 may receive a power control signal from the second electronic device 202. The first electronic device 201 may apply the charging current to the first conductive coil 215 that is disposed inside the first electronic device 201 in response to a reception of the power control signal. When the charging current is applied to the first conductive coil 215, a current may also flow in the second conductive coil 225 included in the second electronic device 202. Through the above process, the first electronic device 201 may transmit power to the second electronic device 202.

When an event specified in the first electronic device 201 occurs, the first electronic device 201 may transmit information for setting charging power to the second electronic device 202. The second electronic device 202 may increase or decrease the charging power, based on the information for setting the charging power. The specified event may include an ON or OFF state of the display 160. When the display 160 of the first electronic device 201 is turned on from the OFF state, the current consumption used by the system of the first electronic device 201 may increase, thereby decreasing a maximum amount of power transmission possible for wireless transmission. In this case, the first electronic device 201 may transmit information for decreasing the charging power to the second electronic device 202. The second electronic device 202 may control a current flowing through the second conductive coil 225 so as not to exceed the maximum amount of power transmission, based on the received information. Accordingly, a phenomenon in which charging is blocked in the second electronic device 202 may be prevented.

When the display 160 of the first electronic device 201 is turned OFF from an ON state, as the current consumption used by the system of the first electronic device 201 decreases, the maximum amount of power transmission possible for wireless transmission may increase. The first electronic device 201 may transmit information for increasing the charging power to the second electronic device 202. The second electronic device 202 may increase the current flowing in the second conductive coil 225, based on the received information. As the current flowing through the second conductive coil 225 increases, a time required to fully charge the second electronic device 202 may be decreased.

Assuming that the first electronic device 201 may transmit power of up to 10 W as the wireless power in a sleep state, when the display 160 is turned on (or when the application processor 120 and other components are operating), the maximum amount of power transmission may be decreased to less than 10 W. Accordingly, when the first electronic device 201 is switched from the sleep state to an active state, the first electronic device 201 may set the maximum amount of power transmission to a specific value of less than 10 W (e.g., 5 W) and transmit the set specific value to the receiving device. In contrast, even when the first electronic device 201 is switched from the active state to the sleep state, the first electronic device 201 may transmit a packet for resetting the maximum amount of power transmission. The first electronic device 201 may transmit a 10 W value (maximum value).

The specified event may include a case in which at least one of the applications is executed or a case in which the connection of the TA is released. When at least one of the applications is executed or the TA is disconnected, the first electronic device 201 may transmit information for decreasing the charging power to the second electronic device 202. Because the conventional electronic device does not transmit information to decrease the charging power to the second electronic device 202 even when the specified event occurs, the second electronic device 202 may request power exceeding the maximum amount of power transmission that the first electronic device 201 may transmit. In this case, the charging may be stopped or the second electronic device 202 may malfunction. However, when the specified event occurs, as the first electronic device 201 transmits information to decrease the charging power to the second electronic device 202, interruption of the charging may be prevented or the malfunction of the second electronic device 202 may be prevented.

The specified event may include a case in which the executed application is terminated or a case in which a TA is connected. When the executed application is terminated or the TA is connected, the first electronic device 201 may transmit information for increasing the charging power to the second electronic device 202. A conventional electronic device does not transmit information for increasing charging power to the second electronic device 202 even when the specified event occurs. In this case, the second electronic device 202 determines that the maximum amount of power transmission of the first electronic device 201 is low, and may charge the battery with a current corresponding to a power amount less than the maximum amount of power transmission that the first electronic device 201 may transmit. Accordingly, a time required to fully charge the second electronic device 202 may be very long. However, when the specified event occurs, as the first electronic device 201 transmits information for increasing charging power to the second electronic device 202, the time required to charge the second electronic device 202 may be decreased.

The first electronic device 201 may change the maximum amount of power transmission depending on a type of the TA. For example, when a general charging TA (e.g., a 5V TA) is connected to the first electronic device 201, the maximum amount of power transmission may be less than when the TA is not connected. When the general charging TA is connected, wireless power is transmitted based on 5V. When wireless power transmission is performed based on 5V, wireless charging efficiency may be very low. That is, when 5 W is the maximum amount of power transmission when the 5V TA is connected, the first electronic device 201 may transmit up to 10 W when the TA is not connected. Accordingly, the first electronic device 201 may transmit a packet for resetting the maximum amount of power transmission to the second electronic device 202 depending on whether the TA is connected.

When the high speed charging TA (e.g., a 9V or more TA) is connected to the first electronic device 201, the maximum amount of power transmission is transmitted to the second electronic device 202 regardless of a situation (e.g., display ON/OFF) of the system. When the high speed charging TA is connected, the maximum amount of power transmission may be greater than or equal to that of charging only using the first battery 213.

Figure 6:
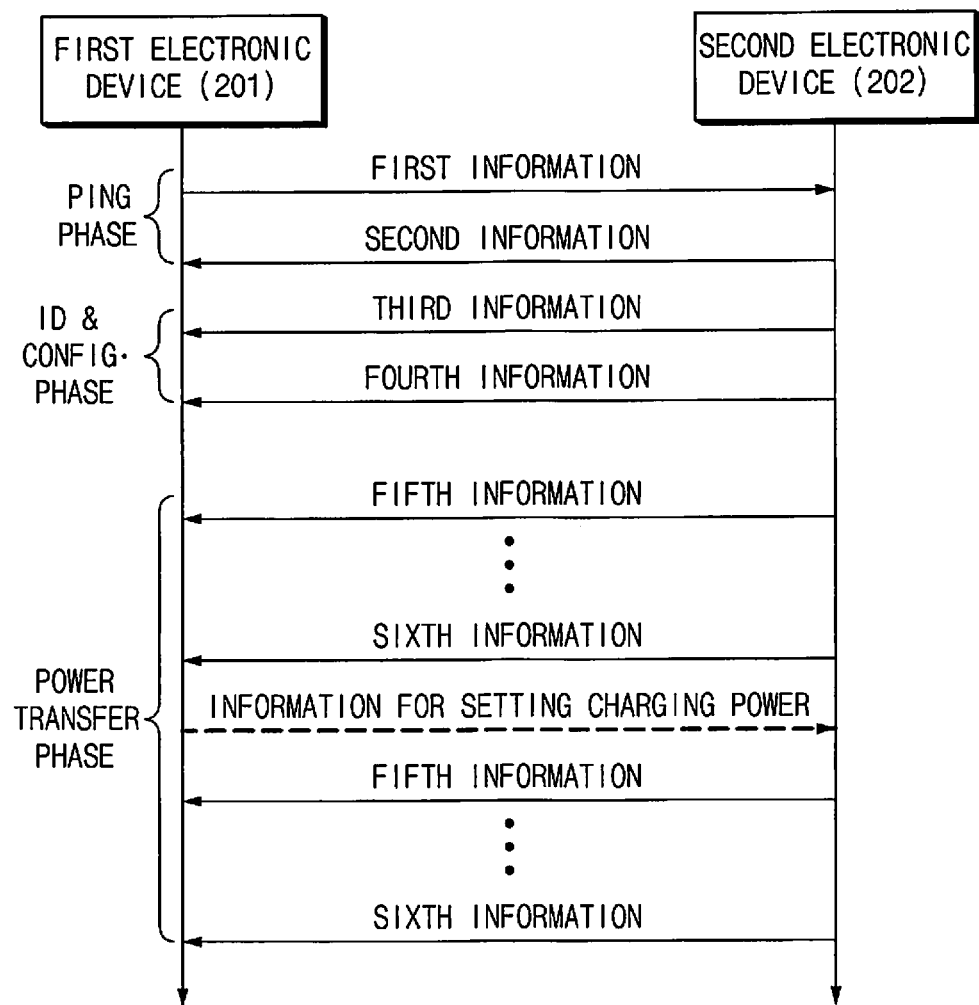
FIG. 6 is a flowchart illustrating operations of a first electronic device and a second electronic device, according to an embodiment.

FIG. 6 is a flowchart illustrating operations of a first electronic device and a second electronic device, according to an embodiment. More specifically, FIG. 6 illustrates an operation sequence of the first electronic device 201 and the second electronic device 202 illustrated in FIG. 5 in more detail. FIG. 6 is only an embodiment, and various embodiments of the disclosure are not limited to that illustrated in FIG. 6. For example, the operation sequence of the disclosure may be different from that illustrated in FIG. 6, and some operations illustrated in FIG. 6 may be omitted.

Referring to FIG. 6, the first electronic device 201 and the second electronic device 202 may enter a first state. The first state is a state that the first electronic device 201 detects the second electronic device 202, and the first state may be referred to as a "ping phase". In the first state, the first electronic device 201 may transmit first information for detecting the second electronic device 202 to the second electronic device 202. Upon receiving the first information, the second electronic device 202 may transmit second information for starting a wireless charging protocol to the first electronic device 201. The first information and the second information may be referred to as a "digital ping" and a "signal strength packet", respectively. The first electronic device 201 may operate in the first state, based on an input for setting a wireless power transmission mode to transmit the wireless power to the second electronic device 202.

When wireless charging is started as the second electronic device 202 transmits the second information, the first electronic device 201 and the second electronic device 202 may enter the second state. The second state is a state in which the first electronic device 201 identifies the second electronic device 202, and the second state may be referred to as an "identification and configuration phase". In the second state, the second electronic device 202 may transmit third information that is information (e.g., a WPC version, manufacturer, and/or a product code) related to an identification of the second electronic device 202 and fourth information that is information (e.g., a power grade, and/or a maximum power) related to the power of the second electronic device 202, to the first electronic device 201. The third information and the fourth information may be referred to as an "identification packet" and a "configuration packet", respectively.

When the second electronic device 202 is identified, the first electronic device 201 and the second electronic device 202 may enter a third state. The third state is a state in which the first electronic device 201 transmits the power to the second electronic device 202, and the third state may be referred to as a "power transfer phase". In the third state, the second electronic device 202 may transmit fifth information that requests an increase or decrease of power to be transmitted and sixth information that indicates a power value received by the second electronic device 202, to the first electronic device 201. The fifth information and the sixth information may be referred to as a "control error packet" and a "received power packet", respectively.

When the specified event occurs while the first electronic device 201 wirelessly charges the second electronic device 202, the first electronic device 201 may transmit information for setting the charging power to the second electronic device 202. For example, when the display 160 is turned on from the OFF state, the first electronic device 201 may transmit information for decreasing the charging power to the second electronic device 202. The second electronic device 202 may decrease the magnitude of the current flowing in the second conductive coil 225, based on the received information. Accordingly, charging of the second electronic device 202 may be prevented from being blocked or from malfunctioning.

When the display 160 is turned off from the ON state, the first electronic device 201 may transmit information for increasing the charging power to the second electronic device 202. The second electronic device 202 may increase the magnitude of the current flowing in the second conductive coil 225, based on the received information. Accordingly, the charging time of the second electronic device 202 may be decreased depending on a change of the state of the first electronic device 201.

The first electronic device 201 may perform a role of transmitting information to the second electronic device 202 whenever the amount of power that the first electronic device 201 may supply changes. When the second electronic device 202 receives the packet, the second electronic device 202 may set a reception amount transmitted to the packet to a maximum reception amount and control reception of power within a range according to the maximum reception amount. Additionally, when receiving the packet, the second electronic device 202 may reset or readjust a wireless charging protection algorithm (e.g., an adaptive input current limit (AICL)) of the charger IC that is mounted in the second electronic device 202.

Figure 7:
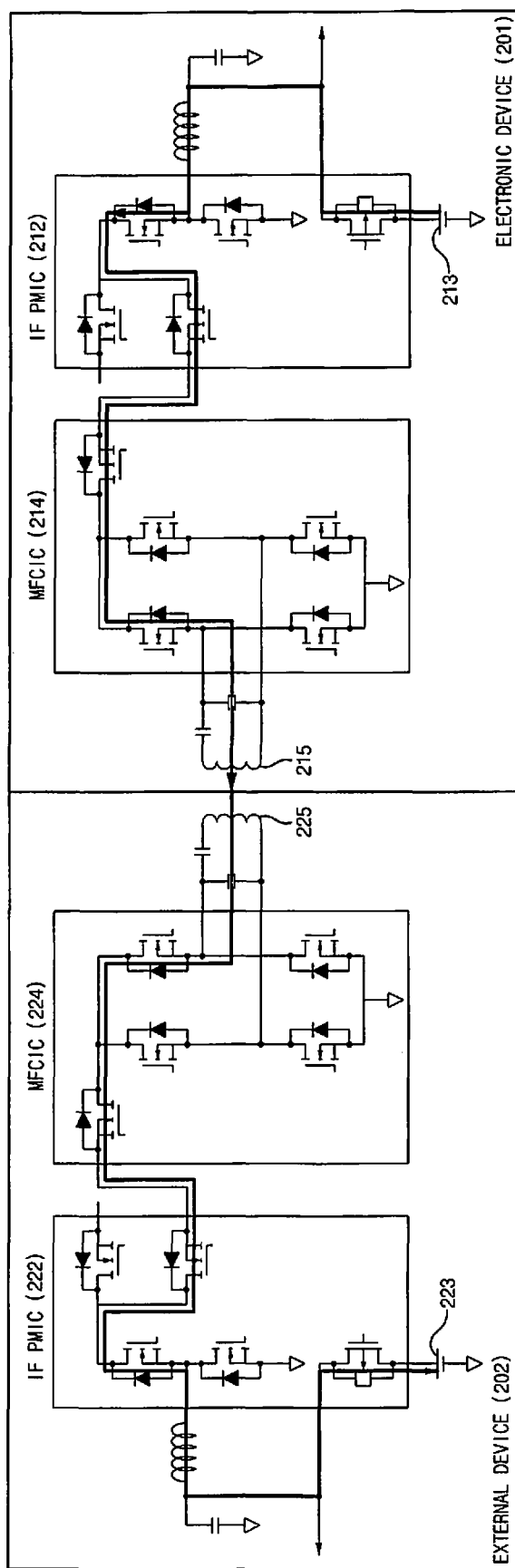
FIG. 7 illustrates a connection relationship between a first electronic device and a second electronic device, according to an embodiment.

FIG. 7 illustrates a connection relationship between a first electronic device and a second electronic device, according to an embodiment.

Referring to FIG. 7, the first electronic device 201 includes the first power management circuit 212, the first battery 213, the first wireless charging IC 214, and the first conductive coil 215. The second electronic device 202 includes the second conductive coil 225, the second wireless charging circuit 224, the second power management circuit 222, and the second battery 223.

The first power management circuit 212 may transmit the power received from the first battery 213 to the first wireless charging circuit 214, and the first wireless charging circuit 214 may apply the charging current to the first conductive coil 215. When the charging current flows in the first conductive coil 215, an induction current may flow in the second conductive coil 225. The induced current may flow through the second wireless charging circuit 224 and the second power management circuit 222. The second power management circuit 222 may charge the second battery 223, based on the induced current. Through the above-described process, power may be transmitted from the first battery 213 of the first electronic device 201 to the second battery 223 of the second electronic device 202.

Figure 8:
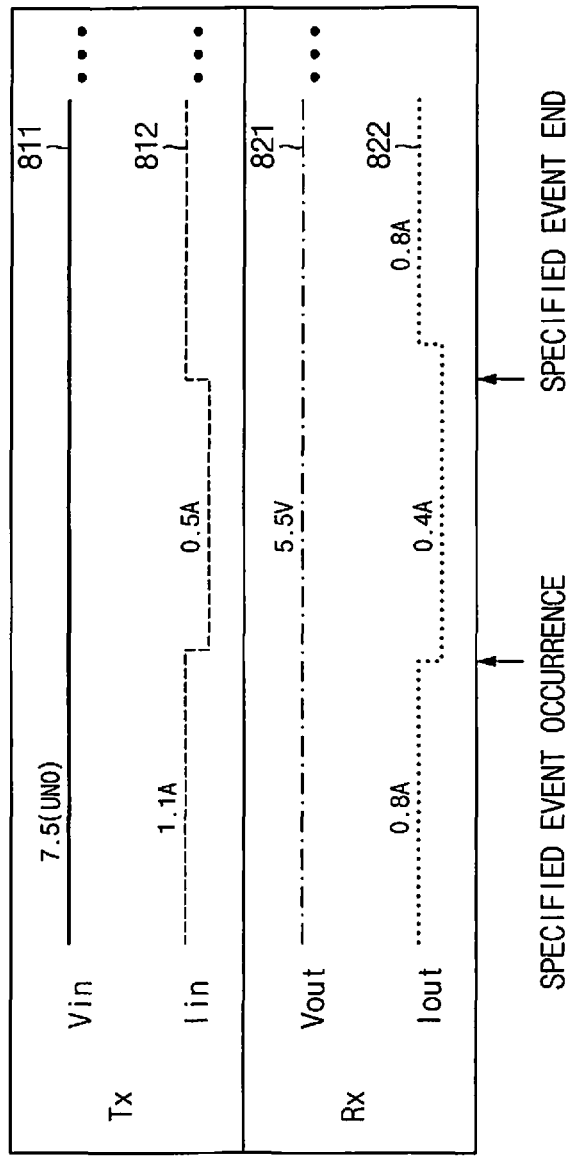
FIG. 8 illustrates a voltage and a current applied inside a first electronic device and a second electronic device, according to an embodiment.
Figure 9:
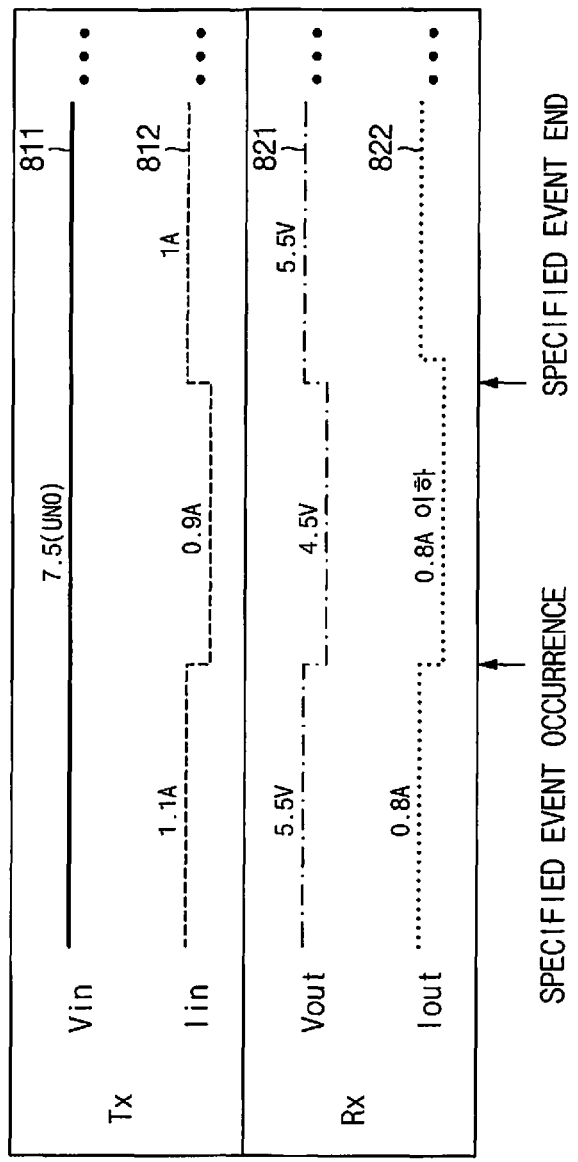
FIG. 9 illustrates a voltage and a current applied inside a first electronic device and a second electronic device, according to an embodiment.

FIG. 8 illustrates a voltage and a current applied inside a first electronic device and a second electronic device, according to an embodiment. FIG. 9 illustrates a voltage and a current applied inside a first electronic device and a second electronic device, according to another embodiment.

FIG. 8 illustrates the voltage and the current applied inside the first electronic device 201 and the second electronic device 202 when a function of the disclosure is performed without the wireless charging protection algorithm (e.g., the adaptive input current limit (AICL)) operation of the second electronic device 202. FIG. 9 illustrates the voltage and the current applied inside the first electronic device 201 and the second electronic device 202 when the function of the disclosure is performed with the wireless charging protection algorithm (e.g., the AICL) operation of the second electronic device 202.

The second electronic device 202 may determine the maximum input power by causing the second power management circuit 222 to pull the current as far as possible to the extent that no voltage drop occurs with respect to an input power source. The second power management circuit 222 of the second electronic device 202 may set the current when the input power source is pulled up within a valid range without the voltage drop to the maximum value of the charging current, and may charge the second battery 223 only within a range equal to or less than the maximum current value. The input power source may be a wireless charging transmission power transmitted by the first electronic device 201. The wireless charging protection algorithm may be a process in which the second electronic device 202 identifies the charging current.

In FIGS. 8 and 9, a first graph 811 denotes a voltage applied between the first power management circuit 212 and the first wireless charging circuit 214 of FIG. 7, and a second graph 812 denotes a current flowing from the first power management circuit 212 to the first wireless charging circuit 214. A third graph 821 denotes a voltage applied between the second wireless charging circuit 224 and the second power management circuit 222 of FIG. 7, and a fourth graph 822 denotes a current flowing from the second wireless charging circuit 224 to the second power management circuit 222.

Referring to FIG. 8, when the specified event in the first electronic device 201 occurs, the first electronic device 201 may transmit information for setting the charging power to the second electronic device 202. For example, when the display 160 is turned on from the OFF state, the first electronic device 201 may transmit the information (e.g., information that sets the charging power of FIG. 6) for decreasing the charging power to the second electronic device 202. The second electronic device 202 that receives the information may decrease the current flowing in the second conductive coil 225. Accordingly, the charging of the second electronic device 202 may be prevented from being blocked or from malfunctioning.

When the specified event ends, the first electronic device 201 may transmit information (e.g., information for setting the charging power of FIG. 6) for setting the charging power to the second electronic device 202 again. For example, when the display 160 is turned off from the ON state, the first electronic device 201 may transmit information for increasing the charging power to the second electronic device 202. The second electronic device 202 that receives the information may increase the current flowing in the second conductive coil 225. When the magnitude of the current flowing in the second conductive coil 225 increases, the charging power may also increase, thereby decreasing the charging time.

According to a conventional electronic device, even though the specified event occurs, information for setting the power may not be transmitted. When the information for setting the power is not transmitted, as the second electronic device 202 does not increase or decrease the charging power in response to the event occurring in the electronic device, charging may be blocked or a malfunction may occur. However, when the specified event occurs, as the first electronic device 201 transmits information for setting the power to the second electronic device 202, the second electronic device 202 may change the charging power setting. Accordingly, a phenomenon in which charging is blocked or a malfunction occurs may be prevented.

When a user scenario (e.g., game, streaming, or video recording) is executed, the first electronic device 201 may store the required power consumption that is expected for each user scenario. The required power consumption may be stored by a test in a manufacturing process. In addition, the required power consumption may be accumulated (or stored in memory 130) as data in the database. The data collected by utilizing a current sensing function inside the terminal. The collected data may be stored in the database as statistical data. Accordingly, whenever the user scenario is changed, the first electronic device 201 may transmit a packet for resetting the wireless power transmission amount to the second electronic device 202.

Referring to FIG. 9, when the specified event occurs in the first electronic device 201, the charging current flowing in the second electronic device 202 may decrease due to the wireless charging protection algorithm. For example, while the first electronic device 201 wirelessly charges the second electronic device 202, the display 160 of the first electronic device 201 may be in the ON state from the OFF state. Since some of the charging current must be applied to the display 160, the amount of current flowing from the first power management circuit 212 to the first wireless charging circuit 214 may be decreased. Because the wireless charging protection algorithm is executed in the case of the second electronic device 202, the current flowing from the second wireless charging circuit 224 to the second power management circuit 222 may decrease. Accordingly, the amount of power charged in the second electronic device 202 may also be decreased.

When the specified event ends, the first electronic device 201 may transmit information for setting the charging power (e.g., information for setting the charging power of FIG. 6) to the second electronic device 202. For example, when the display 160 is turned off from the ON state, the first electronic device 201 may transmit information for resetting the wireless charging protection algorithm to the second electronic device 202. Upon receiving the information, the second electronic device 202 may reset the maximum value of the charging current. Accordingly, the current applied from the second wireless charging circuit 224 to the second power management circuit 222 may increase.

According to a conventional electronic device, even though the specified event ends, information for resetting the wireless charging algorithm may not be transmitted. Accordingly, the maximum value of the charging current and the charging power of the second electronic device 202 may also be maintained at a low level. However, when the specified event ends, the first electronic device 201 may transmit information for resetting the wireless charging algorithm. Accordingly, the maximum value of the charging current may be reset and the charging power may also increase. Because charging power is increased, the time required for the second battery 223 of the second electronic device 202 to be fully charged may decrease.

Figure 10:
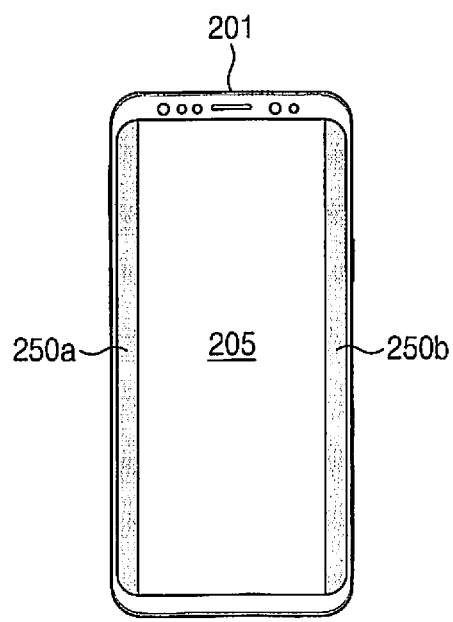
FIG. 10 illustrates a front surface of a first electronic device, according to an embodiment.

FIG. 10 illustrates a front surface of a first electronic device, according to an embodiment.

Referring to FIG. 10, a first light emitting part 250a and a second light emitting part 250b are disposed at an edge region of a display 205 of the first electronic device 201. When the first electronic device 201 and the second electronic device 202 are disposed obliquely with each other, the charging efficiency between the first electronic device 201 and the second electronic device 202 may be decreased or charging may be blocked. When the first electronic device 201 and the second electronic device 202 are disposed obliquely with each other, because the first light emitting part 250a and the second light emitting part 250b emit light, a misalignment between the first electronic device 201 and the second electronic device 202 may be notified to the user.

When the second electronic device 202 is a smart watch, when a rear surface (e.g., a surface in contact with the user's wrist) of the smart watch and a rear surface of the first electronic device 201 are in contact with each other, the first electronic device 201 may wirelessly charge the second electronic device 202. However, when the first electronic device 201 and the smart watch are disposed obliquely with each other, charging efficiency between the first electronic device 201 and the smart watch may be decreased or charging may be blocked. Because the first light emitting part 250a and the second light emitting part 250b emit light when the first electronic device 201 and the smart watch are disposed obliquely with each other, the misalignment between the first electronic device 201 and the smart watch may be notified to the user.

Figure 11:
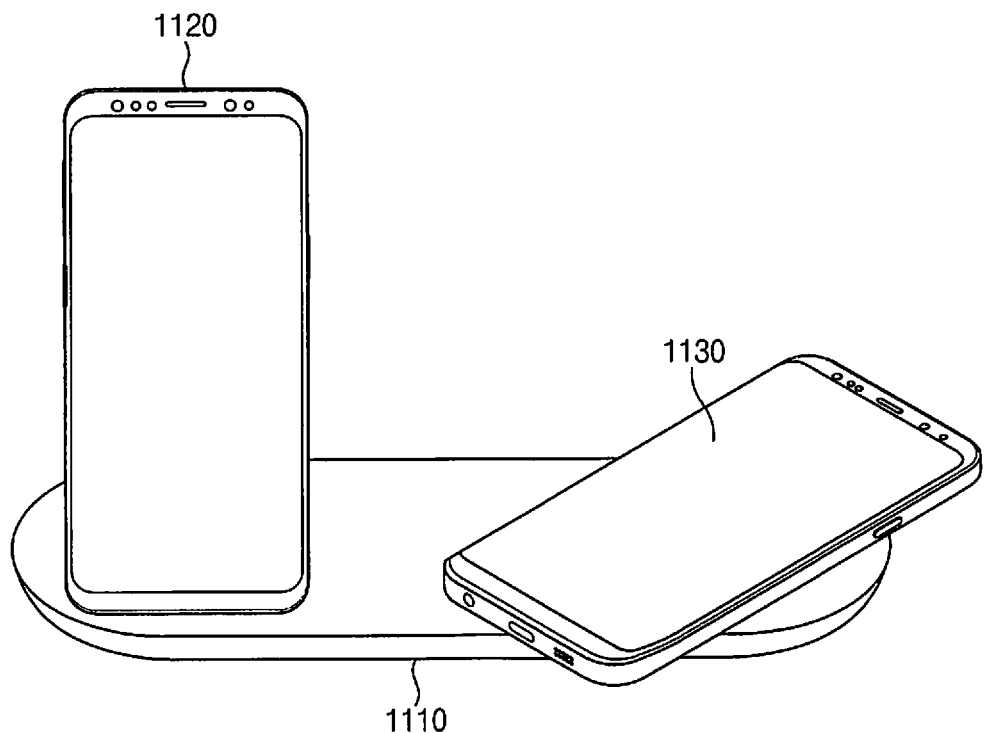
FIG. 11 illustrates a wireless charging pad, a first electronic device, and a second electronic device, according to an embodiment.

FIG. 11 illustrates a wireless charging pad, a first electronic device, and a second electronic device, according to an embodiment.

Referring to FIG. 11, a wireless charging pad 1110 may adjust the amount of power transmitted to the electronic device depending on the number of electronic devices connected to the wireless charging pad 1110. For example, when the maximum amount of power transmission of the wireless charging pad 1110 is 15 W and only a first electronic device 1120 is connected to the wireless charging pad 1110, the wireless charging pad 1110 may charge the first electronic device 1120 with 15 W. When the maximum amount of power transmission of the wireless charging pad 1110 is 15 W and the first electronic device 1120 and a second electronic device 1130 are connected to the wireless charging pad 1110, the wireless charging pad 1110 may charge the first electronic device 1120 with 7.5 W and charge the second electronic device 1130 with 7.5 W.

The maximum amount of power transmission of the wireless charging pad 1110 may vary depending on the capacity of the TA connected to the wireless charging pad 1110. For example, when the TA having a 10 W capacity is connected to the wireless charging pad 1110 and only the first electronic device 1120 is connected to the wireless charging pad 1110, the wireless charging pad 1110 may charge the first electronic device 1120 with 10 W.

The wireless charging pad 1110 may communicate with the electronic device (the first electronic device 1120 or the second electronic device 1130), and may adjust an amount of power transmitted to the electronic device, based on information (e.g., information for setting charging power of FIG. 6) received from the electronic device. For example, while the wireless charging pad 1110 is charging the first electronic device 1120 with 7.5 W, the wireless charging pad 1110 may receive request information for increasing the charging power from the first electronic device 1120. The wireless charging pad 1110 may increase the charging power from 7.5 W to 15 W or decrease the charging power from 15 W to 7.5 W, based on the request information.

The wireless charging pad 1110 may adjust the amount of power transmitted to the electronic device based on a communication result between the first electronic device 1120 and the second electronic device 1130. For example, when the second electronic device 1130 is fully charged while the wireless charging pad 1110 charges the first electronic device 1120 with 7.5 W and charges the second electronic device 1130 with 7.5 W, the second electronic device 1130 may transmit information indicating that charging is completed to the first electronic device 1120. The first electronic device 1120 may transmit request information for increasing the charging power to the wireless charging pad 1110, and the wireless charging pad 1110 may increase the charging power from 7.5 W to 15 W or decrease the charging power from 15 W to 7.5 W, based on the request information.

When one of the first electronic device 1120 and the second electronic device 1130 is fully charged, the wireless charging pad 1110 may transmit information (e.g., information for setting the charging power of FIG. 6) for setting charging power to the other electronic devices. For example, when the first electronic device 1120 is fully charged, the wireless charging pad 1110 may transmit information for setting the charging power to the second electronic device 1130. The second electronic device 1130 may increase the current flowing in the second conductive coil 225, based on the received information.

The first electronic device 1120 and the second electronic device 1130 may output a user interface (UI) for adjusting the amount of power that may be received from the wireless charging pad 1110. The user may adjust charging speeds of the first electronic device 1120 and the second electronic device 1130 through the UI.

The wireless charging pad 1110 may adjust the amount of power transmitted to the electronic device based on the battery state of the first electronic device 1120 and the second electronic device 1130. For example, when a defect occurs in the battery of the first electronic device 1120 while the wireless charging pad 1110 charges the first electronic device 1120 with 7.5 W and charges the second electronic device 1130 with 7.5 W, the electronic device may charge the second electronic device 1130 with 15 W.

The electronic device 201 may include the housing 305 including the first plate 323, the second plate 309 spaced apart from the first plate 323 and facing the first plate 323, and a side member at least partially surrounding a space between the first plate 323 and the second plate 309, the display 160 located in the space and visible through the first plate 323, the conductive coil 215 parallel to the second plate 309 and disposed between the display 160 and the second plate 309, the wireless charging circuit 214 electrically connected to the conductive coil 215, and the processor 211 operationally connected with the display 160 and the wireless charging circuit 214. The processor 211 may receive the power control signal from the external device 202, apply a charging current to the conductive coil 215, based on the power control signal, sense whether a specified event occurs while the charging current is applied, and when the specified event occurs, transmits information for setting a charging power corresponding to the specified event to the external device 202.

The processor 211 may receive information for identifying the external device 202 from the external device 202 through the conductive coil 215, and determine whether the external device 202 supports wireless charging, based on the information for identifying the external device 202.

The processor 211 may transmit information for decreasing the charging power to the external device 202, when an event in which the charging current decreases occurs.

The event in which the charging current decreases may include at least one of an event in which the display 160 is turned on from an OFF state, an event in which at least one application is executed, and an event in which a TA is disconnected.

The processor 211 may transmit information for increasing the charging power to the external device 202, when an event in which the charging current increases occurs.

The event in which the charging current increases may include at least one of an event in which the display 160 is turned off from an on state, an event in which at least one running application is terminated, and an event in which a TA is connected to the electronic device 201.

The electronic device 201 may further include the memory 130 operationally connected to the processor 211, and when the specified event occurs, the processor 211 may measure a power consumption corresponding to the specified event and store the measured power consumption in the memory 130.

The electronic device 201 may include the housing 305 including the first plate 323, the second plate 309 spaced apart from the first plate and facing the first plate 323, and a side member at least partially surrounding a space between the first plate 323 and the second plate 309, the display 160 located in the space and visible through the first plate 323, the conductive coil 215 parallel to the second plate 309 and disposed between the display 160 and the second plate 309, the wireless charging circuit 214 electrically connected to the conductive coil 215, and the processor 211 operationally connected with the display 160 and the wireless charging circuit 214. The processor 211 may receive the power control signal from the external device 202, apply a charging current to the conductive coil 215, based on the power control signal to perform wireless charging for the external device 202, and when an event of increasing the charging current occurs during the wireless charging, transmit information for resetting a wireless charging protection algorithm to the external device 202, wherein the wireless charging protection algorithm allows the battery 223 included in the external device 202 to be charged by maintaining a current flowing in the conductive coil 215 included in the external device 202 below a specified value.

The external device 202 may reset a maximum charging current value that flows to the conductive coil 225 included in the external device 202 in response to receiving the information.

The external device 202 may execute the wireless charging protection algorithm when an event in which the charging current decreases during the wireless charging occurs.

The event in which the charging current decreases may include at least one of an event in which the display 160 is turned on from an off state, an event in which at least one application is executed, and an event in which a TA is disconnected.

The event in which the charging current increases may include at least one of an event in which the display 160 is turned off from an ON state, an event in which at least one running application is terminated, and an event in which a TA is connected to the electronic device 201.

The processor 211 may receive information for identifying the external device 202 from the external device 202 through the conductive coil 215, and determine whether the external device 202 supports wireless charging, based on the information for identifying the external device 202.

The processor 211 may receive information requesting an increase of charging power from the external device 202, and transmit power corresponding to the information requesting the increase of the charging power to the external device 202.

The processor 211 may receive information requesting a decrease of charging power from the external device 202, and transmit power corresponding to the information requesting the decrease of the charging power to the external device 202.

A method for wirelessly charging an external device 202 may include receiving a power control signal from the external device 202, applying a charging current to a conductive coil 215, based on the power control signal, sensing whether a specified event occurs while the charging current is applied, and transmitting information for setting a charging power corresponding to the specified event to the external device 202 when the specified event occurs.

The method may include receiving information for identifying the external device 202 from the external device 202, and determining whether the external device 202 supports wireless charging, based on the information for identifying the external device 202.

The transmitting of the information for setting the charging power corresponding to the specified event to the external device 202 when the specified event occurs, may include transmitting information for decreasing the charging power to the external device 202 when an event in which the charging current decreases occurs.

The transmitting of the information for setting the charging power corresponding to the specified event to the external device 202 when the specified event occurs, may include transmitting information for increasing the charging power to the external device 202 when an event in which the charging current increases occurs.

The method may further include measuring the charging power corresponding to the specified event when the specified event occurs, and storing the measured charging power.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, in performing wireless charging, wireless charging may not be blocked and malfunctioning of an external device may be prevented due to a state change of an electronic device. Additionally, a wireless charging time between an electronic device and an external electronic device may be decreased.

In addition, various effects may be provided that are directly or indirectly identified through the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a housing including a first plate, a second plate spaced apart from the first plate and facing the first plate, and a side member at least partially surrounding a space between the first plate and the second plate;
   a display located in the space and visible through the first plate;
   a conductive coil parallel to the second plate and disposed between the display and the second plate;
   a wireless charging circuit electrically connected to the conductive coil; and
   a processor operationally connected with the display and the wireless charging circuit, the processor configured to:
   receive a power control signal from an external device,
   apply a charging current to the conductive coil, based on the power control signal,
   sense whether a specified event occurs while the charging current is applied, and
   when the specified event occurs, transmit information for setting a charging power corresponding to the specified event to the external device,
   wherein the specified event includes at least one of an event in which the display is turned on from an off state or turned off from an on state, an event in which at least one application is newly executed or terminated, and an event in which a travel adapter (TA) is connected or disconnected to the electronic device.

2. The electronic device of claim 1, wherein the processor is further configured to:
   receive information for identifying the external device from the external device through the conductive coil, and determine whether the external device supports wireless charging, based on the information for identifying the external device.

3. The electronic device of claim 1, wherein the processor is further configured to transmit information for decreasing the charging power to the external device, when an event in which the charging current decreases occurs.

4. The electronic device of claim 3, wherein the event in which the charging current decreases includes at least one of the event in which the display is turned on from an off state, the event in which at least one application is executed, and the event in which a travel adapter (TA) is disconnected.

5. The electronic device of claim 1, wherein the processor is further configured to transmit information for increasing the charging power to the external device, when an event in which the charging current increases occurs.

6. The electronic device of claim 5, wherein the event in which the charging current increases includes at least one of the event in which the display is turned off from an on state, the event in which at least one running application is terminated, and the event in which a travel adapter (TA) is connected to the electronic device.

7. The electronic device of claim 1, further comprising a memory operationally connected to the processor,
   wherein, when the specified event occurs, the processor is further configured to measure a power consumption corresponding to the specified event and store the measured power consumption in the memory.

8. An electronic device, comprising:
   a housing including a first plate, a second plate spaced apart from the first plate and facing the first plate, and a side member at least partially surrounding a space between the first plate and the second plate;
   a display located in the space and visible through the first plate;
   a conductive coil parallel to the second plate and disposed between the display and the second plate;

a wireless charging circuit electrically connected to the conductive coil; and a processor operationally connected with the display and the wireless charging circuit, the processor configured to:

receive a power control signal from an external device, apply a charging current to the conductive coil, based on the power control signal to perform wireless charging for the external device, and when an event of increasing the charging current occurs during the wireless charging, transmit information for resetting a wireless charging protection algorithm to the external device, wherein the wireless charging protection algorithm allows a battery included in the external device to be charged by maintaining a current flowing in the conductive coil included in the external device below a specified value.

9. The electronic device of claim 8, wherein the external device is further configured to reset a maximum charging current value that flows to the conductive coil included in the external device in response to receiving the information.

10. The electronic device of claim 8, wherein the external device is further configured to execute the wireless charging protection algorithm when an event in which the charging current decreases during the wireless charging occurs.

11. The electronic device of claim 10, wherein the event in which the charging current decreases includes at least one of an event in which the display is turned on from an off state, an event in which at least one application is executed, and an event in which a travel adapter (TA) is disconnected.

12. The electronic device of claim 8, wherein the event in which the charging current increases includes at least one of an event in which the display is turned off from an on state, an event in which at least one running application is terminated, and an event in which a travel adapter (TA) is connected to the electronic device.

13. The electronic device of claim 8, wherein the processor is further configured to:

receive information for identifying the external device from the external device through the conductive coil; and determine whether the external device supports the wireless charging, based on the information for identifying the external device.

14. The electronic device of claim 8, wherein the processor is further configured to:

receive information requesting an increase of charging power from the external device; and transmit power corresponding to the information requesting the increase of the charging power to the external device.

15. The electronic device of claim 8, wherein the processor is further configured to:

receive information requesting a decrease of charging power from the external device; and transmit power corresponding to the information requesting the decrease of the charging power to the external device.

16. A method for wirelessly charging an external device, the method comprising:

receiving a power control signal from the external device;

applying a charging current to a conductive coil, based on the power control signal;

sensing whether a specified event occurs while the charging current is applied; and transmitting information for setting a charging power corresponding to the specified event to the external device when the specified event occurs, wherein the specified event includes at least one of an event in which a display is turned on from an off state or turned off from an on state, an event in which at least one application is newly executed or terminated, and an event in which a travel adapter (TA) is connected or disconnected to the electronic device.

17. The method of claim 16, further comprising:

receiving information for identifying the external device from the external device; and determining whether the external device supports wireless charging, based on the information for identifying the external device.

18. The method of claim 16, wherein transmitting the information for setting the charging power corresponding to the specified event to the external device when the specified event occurs includes transmitting information for decreasing the charging power to the external device when an event in which the charging current decreases occurs.

19. The method of claim 16, wherein transmitting the information for setting the charging power corresponding to the specified event to the external device when the specified event occurs includes transmitting information for increasing the charging power to the external device when an event in which the charging current increases occurs.

20. The method of claim 16, further comprising:

measuring the charging power corresponding to the specified event when the specified event occurs; and storing the measured charging power.

* * * * *